(12) United States Patent  
Nam et al.

(10) Patent No.: US 11,881,150 B2
(45) Date of Patent: Jan. 23, 2024

(54) DISPLAY DEVICE

(71) Applicant: SAMSUNG DISPLAY CO., LTD., Yongin-si (KR)

(72) Inventors: Yang Uk Nam, Yongin-si (KR); Sung Chun Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/872,336

(22) Filed: Jul. 25, 2022

(65) Prior Publication Data

US 2023/0237952 A1 Jul. 27, 2023

(30) Foreign Application Priority Data

Jan. 24, 2022 (KR) .................. 10-2022-0010187

(51) Int. Cl.
*G09G 3/20* (2006.01)

(52) U.S. Cl.
CPC ... *G09G 3/2096* (2013.01); *G09G 2300/0819* (2013.01); *G09G 2330/021* (2013.01)

(58) Field of Classification Search
CPC ......... G09G 3/2096; G09G 2300/0819; G09G 2330/021
See application file for complete search history.

(56) References Cited

U.S. PATENT DOCUMENTS

| 9,753,470 B1 | 9/2017 | Hawley et al. |
| 11,107,397 B2 | 8/2021 | Sung |
| 2020/0152121 A1* | 5/2020 | Sung ...................... H02M 3/158 |
| 2021/0327380 A1* | 10/2021 | Ju ........................ G09G 3/3648 |

FOREIGN PATENT DOCUMENTS

| KR | 10-2018-0058950 | 6/2018 |
| KR | 10-2020-0054421 | 5/2020 |

* cited by examiner

*Primary Examiner* — Towfiq Elahi
(74) *Attorney, Agent, or Firm* — F. Chau & Associates, LLC

(57) ABSTRACT

A display device including: a power management integrated circuit (IC) including a feedback terminal for receiving a feedback voltage that corresponds to an input voltage and an output terminal for supplying a first voltage; a display driver IC electrically connected to the power management IC, the display driver IC including an input terminal for receiving the input voltage that corresponds to the first voltage; and a frequency compensation circuit connected to the input terminal, the feedback terminal, and the output terminal, the frequency compensation circuit including a feedback capacitor and a feedback resistor.

18 Claims, 8 Drawing Sheets

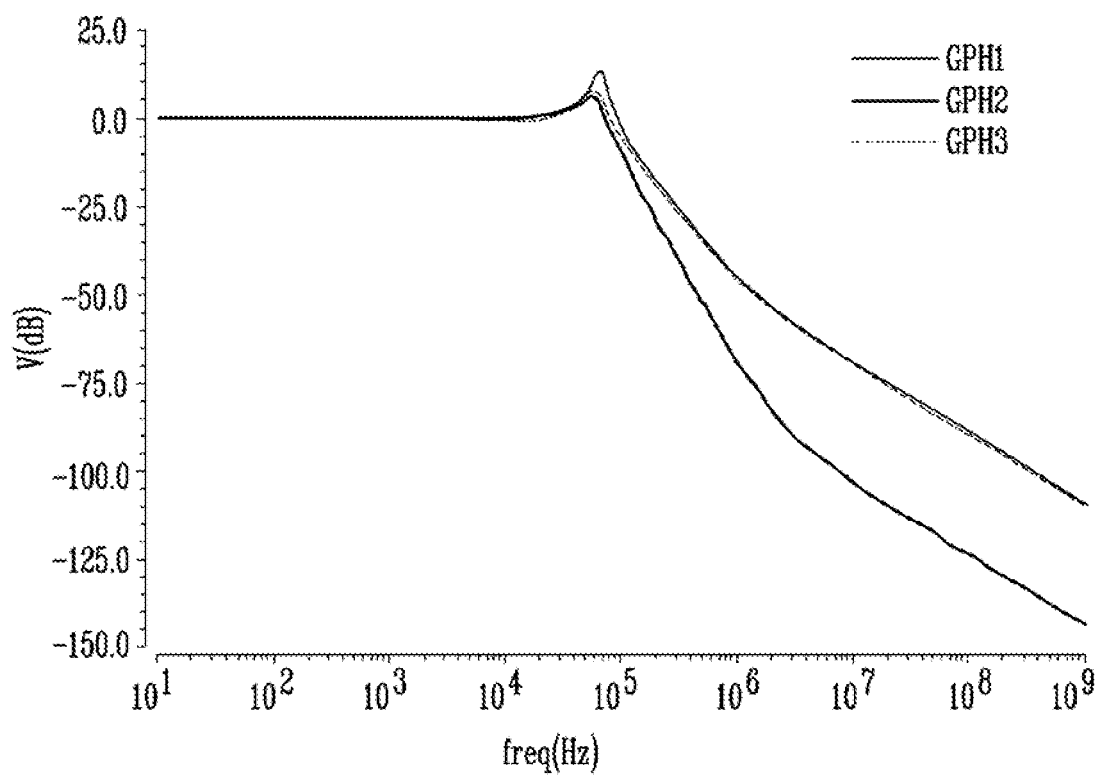

DISPLAY DEVICE

CROSS-REFERENCE TO RELATED APPLICATION

The present application claims priority under 35 U.S.C. § 119(a) to Korean patent application No. 10-2022-0010187 filed on Jan. 24, 2022 in the Korean Intellectual Property Office, the disclosure of which is incorporated by reference herein in its entirety.

1. Technical Field

The present disclosure generally relates to a display device, and more particularly, to a display device including a frequency compensation circuit.

2. Related Art

The importance of a display device, which is an output device for the presentation of information in visual form, has increased with the development of multimedia technology. Accordingly, various types of display devices such as a liquid crystal display device and an organic light emitting display device are now widely used.

An organic light emitting display device may display an image by using organic light emitting diodes (OLEDs) which generate light by recombination of electrons and holes. The organic light emitting display device has impressive characteristics such as a high luminance and a large viewing angle while having a high response speed, and is driven with low power consumption.

In general, the organic light emitting display device may include a display panel, a timing controller, a scan driver, a display driver integrated circuit (IC), and a power management IC for supplying a power voltage to the display driver IC.

The display driver IC may include a regulator for converting the power voltage supplied from the power management IC into a voltage suitable for driving the display panel.

The power management IC may determine a power voltage to be supplied to the display driver IC by considering a voltage required in a high load condition of the organic light emitting display device and a headroom margin of the regulator.

The power voltage supplied from the power management IC to the display driver IC may be determined, based on an output mode (e.g., a worst mode) in which the display panel is driven at a high frequency and the headroom margin of the regulator.

When the display panel is driven according to an output mode (e.g., a normal mode) in which the display panel is driven at a low frequency, power loss may occur in the power voltage supplied from the power management IC to the display driver IC when the power voltage is converted into the voltage suitable for the driving of the display panel.

SUMMARY

Embodiments of the present disclosure provide a display device in which a power management integrated circuit (IC) can supply a power voltage to a display driver IC according to a load condition required in a display panel.

In accordance with an embodiment of the present disclosure, there is provided a display device including: a power management IC including a feedback terminal for receiving a feedback voltage that corresponds to an input voltage and an output terminal for supplying a first voltage; a display driver IC electrically connected to the power management IC, the display driver IC including an input terminal for receiving the input voltage that corresponds to the first voltage; and a frequency compensation circuit connected to the input terminal, the feedback terminal, and the output terminal, the frequency compensation circuit including a feedback capacitor and a feedback resistor.

In accordance with an embodiment of the present disclosure, there is provided a display device including: a power management IC including a frequency compensation circuit and an output terminal for supplying a first voltage; and a display driver IC electrically connected to the power management IC, the display driver IC including an input terminal configured to receive an input voltage corresponding to the first voltage, wherein the frequency compensation circuit includes: a first feedback terminal and a second feedback terminal, wherein the first feedback terminal and the second feedback terminal are configured to receive a feedback voltage corresponding to the input voltage; at least one capacitor connected to the first feedback terminal; and a variable feedback resistor connected to the at least one capacitor and the second feedback terminal.

BRIEF DESCRIPTION OF THE DRAWINGS

Example embodiments of the present disclosure will now be described more fully hereinafter with reference to the accompanying drawings; however, the present disclosure may be embodied in different forms and should not be construed as limited to the embodiments set forth herein.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 3 is a graph illustrating frequency improvement characteristics of the display device including the frequency compensation circuit in accordance with the embodiments of the present disclosure.

DETAILED DESCRIPTION OF THE EMBODIMENTS

Figure 1:
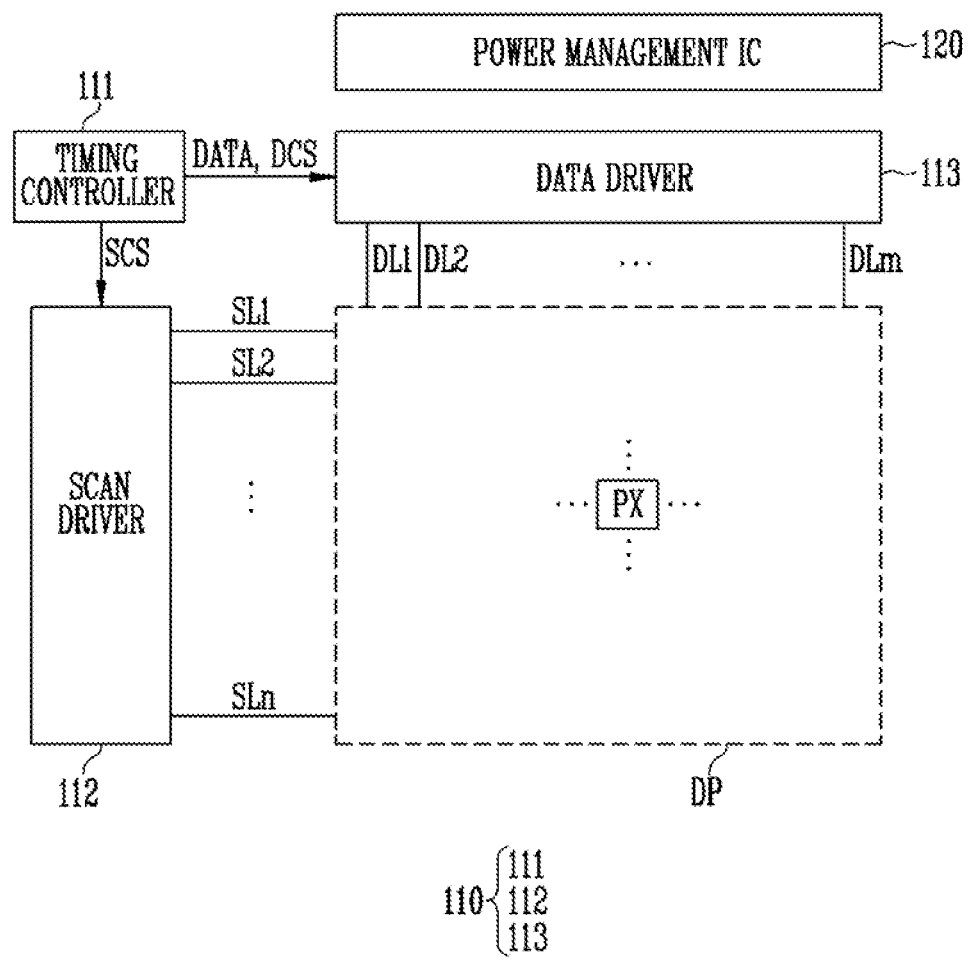
FIG. 1 is a block diagram illustrating a display device in accordance with embodiments of the present disclosure.

FIG. 1 is a block diagram illustrating a display device 100 in accordance with embodiments of the present disclosure.

Referring to FIG. 1, the display device 100 may include a display panel DP including a plurality of pixels PX, a timing controller 111, a scan driver 112, a data driver 113, and a power management integrated circuit (IC) (PMIC) 120.

In an embodiment, the timing controller 111 may provide the data driver 113 with a data value DATA for each frame, a data control signal DCS, and the like.

In an embodiment, the timing controller 111 may provide the scan driver 112 with a clock signal, a scan control signal SCS, and the like.

In an embodiment, the data driver 113 may generate data voltages to be provided to data lines DL1 to DLm by using the data value DATA and the data control signal DCS, which are received from the timing controller 111. Here, m is a natural number.

In an embodiment, the scan driver 112 may generate scan signals to be provided to scan lines SL1 to SLn by receiving the scan control signal SCS (including a clock signal, a scan start signal, and the like) from the timing controller 111. Here, n is a natural number.

In an embodiment, the display panel DP includes the plurality of pixels PX. Each of the pixels PX may be connected to a corresponding data line and a corresponding scan line. The plurality of pixels PX may be arranged in a matrix form.

In an embodiment, each of the plurality of pixels PX may be a red pixel for emitting red light, a blue pixel for emitting blue light, or a green pixel for emitting green light. In another embodiment, the plurality of pixels PX may include white, cyan, magenta, and yellow pixels, instead of the red, green, and blue pixels.

In this specification, a circuit including at least one of the timing controller 111, the scan driver 112, and the data driver 113 may be designated as a display driver IC (DDI) 110.

In an embodiment, the display driver IC 110 may be provided in the form of an integrated circuit (IC).

In an embodiment, the power management IC 120 may receive an external power source (e.g., a battery voltage). In an example, the power management IC 120 may generate a voltage to be supplied to the display driver IC 110, based on an external input voltage of the external power source. In an embodiment, the power management IC 120 may generate a voltage to be provided to the timing controller 111 of the display driver IC 110.

In an embodiment, the power management IC 120 may include at least one regulator. In an example, the at least one regulator may generate an output voltage having various voltage levels from a voltage supplied from the external power source. In an example, the at least one regulator may be formed as a controller (e.g., a controller 121 shown in FIG. 2), or be disposed in the controller. In an example, the at least one regulator may include a buck converter, but the present disclosure is not limited thereto. For example, the at least one regulator may include at least one of a buck-boost converter, a boost converter, and a Cuk converter.

Figure 2:
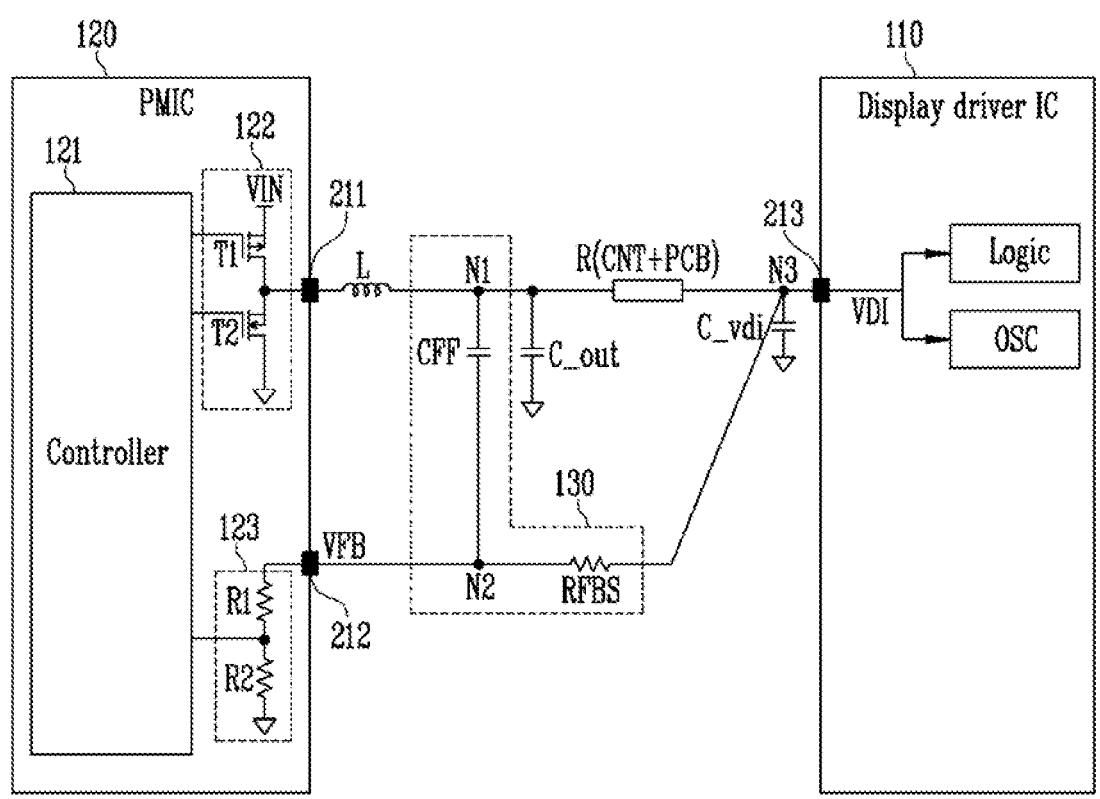
FIG. 2 illustrates a display driver integrated circuit (IC), a power management IC, and a frequency compensation circuit of the display device in accordance with the embodiments of the present disclosure.

FIG. 2 illustrates a display driver IC 110, a power management IC 120, and a frequency compensation circuit 130 of the display device 100 in accordance with the embodiments of the present disclosure.

In an embodiment, the power management IC 120 may include a controller 121, a voltage output circuit 122, and a resistor circuit 123. In an example, the controller 121 may be electrically connected to the voltage output circuit 122 and the resistor circuit 123.

In an embodiment, the voltage output circuit 122 may be connected to an output terminal 211. In an example, a first voltage for supplying an input voltage VDI to the display driver IC 110 may be output through the output terminal 211. In other words, the power management IC 120 may provide a first voltage to the frequency compensation circuit 130.

In an embodiment, the resistor circuit 123 may be connected to a feedback terminal 212. In an example, a feedback voltage VFB with respect to the input voltage VDI supplied to the display driver IC 110 may be supplied through the feedback terminal 212. In other words, the feedback compensation circuit 130 may provide the power management IC 120 with the feedback voltage VFB.

In an embodiment, the controller 121 may include a pulse width modulation (PWM) circuit, and generate a PWM control signal through the PWM circuit. The PWM control signal may adjust a pulse width or an on-off duty ratio, thereby alternately turning on/off transistors T1 and T2 included in the voltage output circuit 122.

In an embodiment, the controller 121 may control the first voltage output through the output terminal 211 so that the input voltage VDI supplied to an input terminal 213 of the display driver IC 110 is constant.

In an embodiment, the voltage output circuit 122 may output the first voltage through the output terminal 211, based on the PWM control signal received from the controller 211 and an initial voltage VIN.

In an embodiment, an inductor L may be disposed to be connected to the output terminal 211. For example, the inductor L may be disposed between the output terminal 211 and the frequency compensation circuit 130. In an example, the inductor L may store energy while a current is supplied when the transistor T1 is turned on and the second transistor T2 is turned off. In an example, when the transistor T1 is turned off and the second transistor T2 is turned on, the current may be supplied based on the energy stored in the inductor L.

In an embodiment, the display driver IC 110 may be supplied with the input voltage VDI corresponding to the first voltage output from the power management IC 120 through the input terminal 213. In an example, the input voltage VDI may include a power voltage of the display driver IC 110.

In an embodiment, a parasitic capacitor C_out with respect to the first voltage output through the output terminal 211 may be disposed between the output terminal 211 and a ground voltage. In an example, the parasitic capacitor C_out may be disposed between the inductor L and the ground voltage.

In an embodiment, a printed circuit board PCB including a connector CNT may be disposed between the input terminal 213 of the display driver IC 110 and the output terminal 211 of the power management IC 120.

In an embodiment, the inductor L may be disposed between the output terminal 211 of the power management IC 120 and a first node N1. The inductor L may be connected to a feedback capacitor CFF through the first node N1. The feedback capacitor CFF and the first node N1 may be provided in the frequency compensation circuit 130.

In an embodiment, the parasitic capacitor C_out may be disposed between the first node N1 and the ground voltage. One end of the parasitic capacitor C_out may be connected to the printed circuit board PCB including the connector CNT, and the other end of the parasitic capacitor C_out may be connected to the ground voltage. In other words, a first terminal of the parasitic capacitor C_out may be connected to the printed circuit board PCB and a second terminal of the parasitic capacitor C_out may be connected to the ground voltage.

In an example, one end of the printed circuit board PCB including the connector CNT may be connected to the parasitic capacitor C_out with respect to the first voltage, and the other end of the printed circuit board PCB may be connected to a parasitic capacitor C_vdi with respect to the input voltage VDI through a third node N3.

In an embodiment, the first voltage output from the power management IC 120 may be transferred to the input terminal 213 of the display driver IC 110 through the connector CNT.

In an embodiment, a voltage drop of the first voltage output from the power management IC 120 may occur in the printed circuit board PCB including the connector CNT. A voltage drop of the first voltage output from the power management IC 120 may occur when the first voltage is transferred, and then supplied as the input voltage VDI to the input terminal 213 of the display driver IC 110.

In an embodiment, the input voltage VDI input to the input terminal 213 of the display driver IC 100 may be used as an oscillator voltage for operating an oscillator OSC in the display driver IC 110 and/or a logic voltage for controlling driving.

In an embodiment, the feedback voltage VFB with respect to the input voltage VDI may be sensed at the input terminal 213 of the display driver IC 110. The feedback voltage VFB sensed at the input terminal 213 of the display driver IC 110 may be supplied to the power management IC 120 through the feedback terminal 212.

In an embodiment, the power management IC 120 may generate the first voltage to compensate for a voltage drop occurring when the first voltage output from the power management IC 120 is transferred to the display driver IC 110 using the feedback voltage VFB.

In an embodiment, a degree to which the first voltage output from the output terminal 211 of the power management IC 120 drops may be determined according to a resistance R(CNT+PCB) caused by the printed circuit board PCB including the connector CNT and a load current with respect to the input voltage VDI.

Table 1 shows the first voltage output through the output terminal 211, which is determined, based on the resistance R(CNT+PCB) and the load current, to supply the constant input voltage VDI through the input terminal 213.

TABLE 1

| Load current (Unit: mA) | R(CNT + PCB) (Unit: Ω) | First voltage of PMIC 120 (Unit: V) | Input voltage (VDI) of DDI 110 |
|---|---|---|---|
| 50 | 1 | 1.05 + 0.05 = 1.1 V | 1.05 V |
| 100 | | 1.05 + 0.1 = 1.15 V | |
| 150 | | 1.05 + 0.15 = 1.2 V | |
| 200 | | 1.05 + 0.2 = 1.25 V | |
| 250 | | 1.05 + 0.25 = 1.3 V | |
| 300 | | 1.05 + 0.3 = 1.35 V | |
| 350 | | 1.05 + 0.35 = 1.4 V | |
| 400 | | 1.05 + 0.4 = 1.45 V | |

In an embodiment, the power management IC 120 may receive the feedback voltage VFB with respect to the input voltage VDI, thereby controlling the first voltage output from the power management IC 120. In an example, the controller 121 may generate the first voltage, which is used to compensate for a voltage drop according to the load current and the resistance R(CNT+PCB) caused by the printed circuit board PCB including the connector CNT, to supply a constant voltage to the input terminal 213 of the display driver IC 110. In an example, as a magnitude of the load current and the resistance of the printed circuit board PCB including the connector CNT increases, the controller 121 may increase and generate the first voltage, with a magnitude corresponding to the increased magnitude of the load current, and output the first voltage through the output terminal 211.

In an embodiment, the feedback voltage VFB sensed at the input terminal 213 of the display driver IC 110 may be supplied to the power management IC 120 through the feedback terminal 212.

In an embodiment, a delay of a feedback path may when the feedback voltage VFB sensed at the input terminal 213 of the display driver IC 110 is supplied to the power management IC 120 through the feedback terminal 212. In an example, due to the delay of the feedback path, the controller 121 of the power management IC 120 may oscillate due to a shortage of phase margin. A characteristic of a transient response to a feedback loop may be deteriorated due to the delay of the feedback path. Since the feedback loop is unstable due to the delay of the feedback path, the controller 121 may oscillate.

In an embodiment, the frequency compensation circuit 130 may be included between the display driver IC 110 and the power management IC 120. In an example, the frequency compensation circuit 130 may be electrically connected to the output terminal 211, the input terminal 213, and the feedback terminal 212.

In an embodiment, the frequency compensation circuit 130 may include the feedback capacitor CFF and a feedback resistor RFBS.

In an embodiment, the feedback capacitor CFF may be disposed between the first node N1 connected to the output terminal 211 of the power management IC 120 and a second node N2 connected to the feedback terminal 212.

In an embodiment, the frequency compensation circuit 130 may increase a speed of a feedback loop with respect to the feedback voltage VFB sensed at the input terminal 213. In other words, the frequency compensation circuit 130 may reduce the delay of the feedback path.

In an embodiment, the feedback resistor RFBS may be disposed between the second node N2 connected to the feedback terminal 212 and the third node N3 connected to the input terminal 213 of the display driver IC 110.

In an embodiment, the parasitic capacitor C_vdi with respect to the input voltage VDI may be disposed between the third node N3 and the ground voltage. In other words, a parasitic capacitance may be formed between the third node N3 and the ground voltage.

In an embodiment, the feedback resistor RFBS may be used to minimize influence of the parasitic capacitor C_vdi on the feedback capacitor CFF. In an example, the parasitic capacitor C_vdi may include a parasitic capacitor with respect to the input voltage VDI.

In an embodiment, the first voltage output through the output terminal 211 is influenced as a resistance value of the feedback resistor RFBS increases, and thus, a phase margin in a specific frequency band may not be secured. The resistance value of the feedback resistor RFBS may be set by considering the first voltage output through the output terminal 211 and the phase margin. In an example, the resistance value of the feedback resistor RFBS may be about 100Ω to about 1000Ω.

In an embodiment, the power management IC 120 may include the resistor circuit 123. In an example, the resistor circuit 123 may be connected in series to the feedback terminal 212. In an example, the resistor circuit 123 may include a first resistor R1 and the second resistor R2.

In an embodiment, the first resistor R1 and the second resistor R2 may be connected in series to be connected between the feedback terminal 212 and the ground voltage.

In an embodiment, the first resistor R1 may include a first end connected to the feedback terminal 212 and a second end connected to an input node of the controller 121.

In an embodiment, the second resistor R2 may include a first end connected to the input node of the controller 121 and a second end connected to the ground voltage.

In an embodiment, the first resistor R1 and the second resistor R2 may have the same resistance value. In an embodiment, the first resistor R1 and the second resistor R2 may have different resistance values.

In an embodiment, the feedback resistor RFBS included in the frequency compensation circuit 130 may have a resistance value smaller than a resistance value of the first resistor R1 and the second resistor R2, which are included in the power management IC 120.

In an embodiment, the feedback resistor RFBS may influence the input voltage VDI supplied to the input terminal 213.

Referring to Table 1, in a condition in which the input voltage VDI corresponds to 1.05 V, the first resistor R1 and the second resistor R2 may have a resistance value about 1 MΩ When the feedback resistor RFBS has resistance values of about 0Ω, about 100 KΩ, and about 1 KΩ, input voltages VDI sensed with respect to the resistance values may be different from one another. For example, when the first and second resistors R1 and R2 have a resistance value of about 1 MΩ, and the feedback resistor RFBS has a resistance value of about 0Ω, the input voltage VDI may be about 1.05 V. The feedback capacitor CFF along with the feedback resistor RFBS may not compensate for a frequency characteristic, and therefore, a frequency oscillation may occur.

In another example, when the first and second resistors R1 and R2 have a resistance value of about 1 MΩ, and the feedback resistor RFBS has a resistance value of about 100 kΩ, the sensed input voltage VDI may be about 1.0448 V. When first and second resistors R1 and R2 have a resistance value of about 1 MΩ, and the feedback resistor RFBS has a resistance value of about 1 kΩ, the sensed input voltage VDI may be about 1.0494 V. Therefore, since the first resistor R1 and the second resistor R2 have the same value, the feedback resistor RFBS with respect to data may correspond to a more suitable feedback resistor as the corresponding data is data about which the sensed input voltage VDI becomes closer to 1.05 V. In other words, when the feedback resistor RFBS has a resistance value of about 1 kΩ, the feedback resistor RFBS corresponds to a more suitable feedback resistor RFBS than when the feedback resistor RFBS has a resistance value of about 100 kΩ.

In an embodiment, the display driver IC 110, the power management IC 120, and the frequency compensation circuit 130 may be implemented as separate circuits or be implemented as one circuit.

FIG. 3 is a graph illustrating frequency improvement characteristics of the display device 100 including the frequency compensation circuit 130 in accordance with the embodiments of the present disclosure.

Referring to FIG. 3, a first graph GPH1 represents a frequency characteristic in a case where the feedback voltage VFB at the output terminal 211 of the power management IC 120 is sensed. A second graph GPH2 represents a frequency characteristic in a case where the feedback voltage VFB is provided at the input terminal 213 of the display driver IC 110 when the frequency compensation circuit 130 is not included. A third graph GPH3 represent a frequency characteristic in a case where the feedback voltage VFB is provided at the input terminal 213 of the display driver IC 110 when the frequency compensation circuit 130 is included.

Referring to FIG. 3, the frequency characteristic in the third graph GPH3 may be similar to the frequency characteristic of the first graph GPH1. The frequency compensation circuit 130 is included, so that the frequency characteristic can be improved as the delay of the feedback path is compensated, when the feedback voltage VFB with respect to the input voltage VDI is sensed at the input terminal 213 of the display driver IC 110. Thus, the third graph GPH3 represents data approximate to data of the first graph GPH1.

Figure 4A:
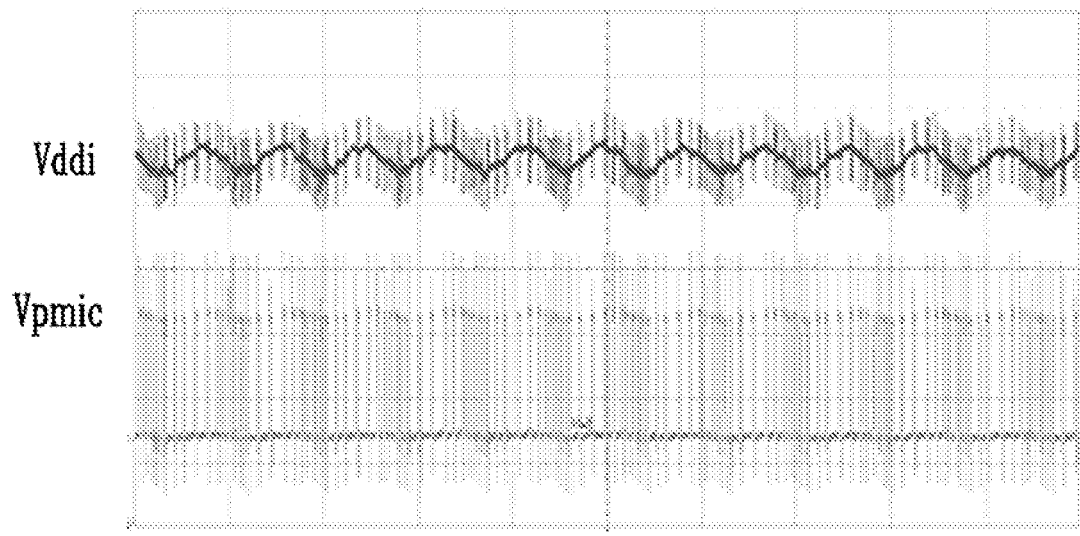
FIG. 4A illustrates ripple voltage waveform diagrams at an output terminal of a power management IC and an input terminal of a display driver IC in a display device of a comparative example.
Figure 4B:
FIG. 4B illustrates ripple voltage waveform diagrams at an output terminal of the power management IC and an input terminal of the display driver IC in the display device including the frequency compensation circuit in accordance with the embodiments of the present disclosure.

FIG. 4A illustrates ripple voltage waveform diagrams at an output terminal of a power management IC and an input terminal of the display driver IC in the display device of a comparative example. FIG. 4B illustrates ripple voltage waveform diagrams at the output terminal 211 of the power management IC 120 and the input terminal 213 of the display driver IC 110 in the display device 100 including the frequency compensation circuit 130 in accordance with the embodiments of the present disclosure.

Referring to FIG. 4A, a ripple voltage Vddi represents a waveform diagram of voltage sensed at an input terminal of a display driver IC in a conventional art in which a frequency compensation circuit (e.g., the frequency compensation circuit 130 shown in FIG. 2) is not disposed. A ripple voltage Vpmic represents a waveform diagram of voltage sensed at an output terminal of a power management IC in the conventional art in which the frequency compensation circuit is not disposed.

In the conventional art, at least one regulator disposed in the power management IC may oscillate as a magnitude of resistance caused by a printed circuit board including a connector and a value of load current with respect to an input voltage VDI increase.

Referring to FIG. 4B, a ripple voltage Vddi' represents a waveform diagram of voltage sensed at the input terminal 213 of the display driver IC 110 when the frequency compensation circuit 130 is disposed in accordance with the embodiments of the present disclosure. A ripple voltage Vpmic' represents a waveform diagram of voltage sensed at the output terminal 211 of the power management IC 120 when the frequency compensation circuit 130 is disposed in accordance with the embodiments of the present disclosure.

Referring to FIGS. 4A and 4B, in accordance with the embodiments of the present disclosure, the response characteristic and stability of the feedback loop is improved by the frequency compensation circuit 130. The stability of the voltage sensed at the input terminal 213 of the display driver IC 110 and the voltage sensed at the output terminal 211 of the power management IC 120 is also improved.

Figure 5:
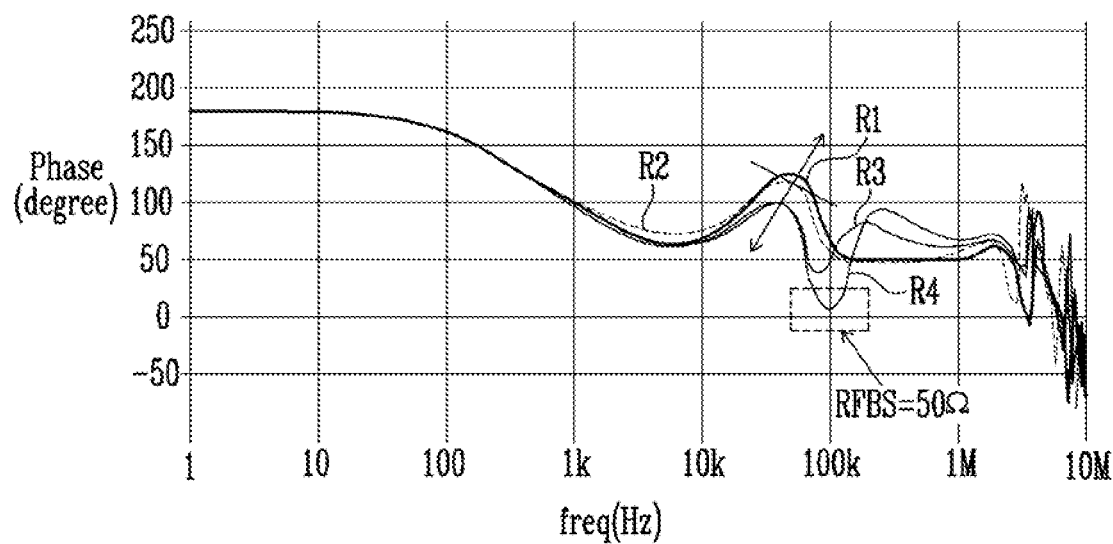
FIG. 5 illustrates a phase margin of the power management IC according to a value of a feedback resistor included in the frequency compensation circuit in accordance with the embodiments of the present disclosure.

FIG. 5 illustrates a phase margin of the power management IC 120 according to a value of the feedback resistor RFBS included in the frequency compensation circuit 130 in accordance with the embodiments of the present disclosure.

In an embodiment, the value of the feedback resistor RFBS included in the frequency compensation circuit 130 may influence the phase margin of the power management IC 120. In an example, when the value of the feedback resistor RFBS is small, a phase margin may not be secured in a specific frequency band.

Referring to FIG. 5, R1 represents a phase margin when the value of the feedback resistor RFBS is about 10 kΩ, R2 represents a phase margin when the value of the feedback resistor RFBS is about 1 kΩ, R3 represents a phase margin when the value of the feedback resistor RFBS is about 100Ω, and R4 represents a phase margin when the value of the feedback resistor RFBS is about 50Ω.

Referring to FIG. 5, when the value of the feedback resistor RFBS is about 50Ω, a phase margin may not be secured in a specific frequency band, and therefore, a frequency oscillation in the specific frequency band may occur in the power management IC 120. Hence, a stable voltage may not be output. For example, when the value of the feedback resistor RFBS is about 50Ω, a phase degree in a frequency band near about 100 kHz rapidly decreases, and therefore, a phase margin may not be secured in a corresponding frequency period.

In an embodiment, the feedback resistor RFBS may be set based on a frequency band and an output voltage according to a module environment of a display device (e.g., the display device 100 shown in FIG. 1).

In an embodiment, the display device 100 includes: the power management IC 120 including the feedback terminal 212 for receiving the feedback voltage VFB that corresponds to the input voltage VDI and the output terminal 211 for supplying the first voltage; the display driver IC 110 electrically connected to the power management IC 120, the display driver IC 110 including an input terminal 213 for receiving the input voltage VDI that corresponds to the first voltage; and a frequency compensation circuit 130 connected to the input terminal 213, the feedback terminal 212, and the output terminal 211, the frequency compensation circuit 130 including a feedback capacitor CFF and a feedback resistor RFBS.

Figure 6:
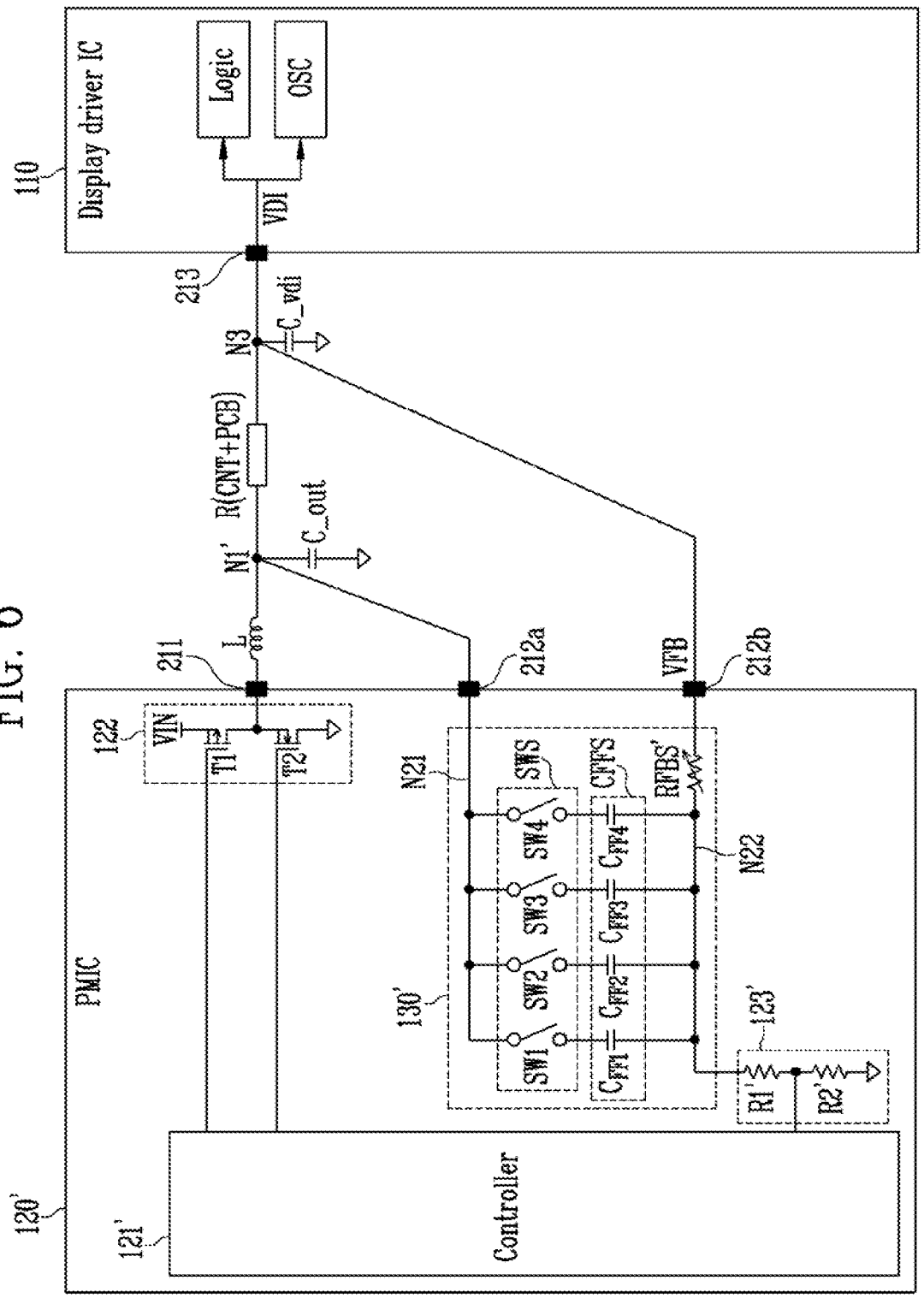
FIG. 6 illustrates a power management IC, a display driver IC, and a frequency compensation circuit in accordance with other embodiments of the present disclosure.

FIG. 6 illustrates a power management IC 120, a display driver IC 110, and a frequency compensation circuit 130' in accordance with other embodiments of the present disclosure.

In FIG. 6, components identical to those described with reference to FIG. 2 are designated by like reference numerals, and their overlapping descriptions will be omitted.

Referring to FIG. 6, the power management IC 120' may include a controller 121', a voltage output circuit 122, a resistor circuit 123', and the frequency compensation circuit 130'. In an example, the controller 121' may be electrically connected to the voltage output circuit 122, the resistor circuit 123, and the frequency compensation circuit 130'.

In an embodiment, the power management IC 120' may include an output terminal 211, a first feedback terminal 212a, and a second feedback terminal 212b.

In an embodiment, the controller 121' may include a PWM circuit. The controller 121' may generate a PWM control signal through the PWM circuit. The PWM control signal may adjust a pulse width or an on-off duty ratio, thereby alternately turning on/off transistors T1 and T2 included in the voltage output circuit 122.

In an embodiment, the controller 121' may control a first voltage output through the output terminal 211 to supply, as a constant voltage, the input voltage VDI supplied to an input terminal 213 of the display driver IC 110.

In an embodiment, the voltage output circuit 122 may output the first voltage through the output terminal 211, based on the PWM control signal received from the controller 121' and an initial voltage VIN.

In an embodiment, an inductor L may be disposed to be connected to the output terminal 211.

In an embodiment, a parasitic capacitor C_out with respect to the first voltage output through the output terminal 211 may be disposed between a first node N1' connected to the output terminal 211 and a ground voltage. In other words, a parasitic capacitance may be formed between the first node N1' and the ground voltage.

In an embodiment, the first feedback terminal 212a may be connected to the first node N1' connected to the output terminal 211. In other words, the first feedback terminal 212a may be connected to the output terminal through the first node N1'.

In an embodiment, the second feedback terminal 212b may be connected to a third node N3 connected to the input terminal 213.

In an embodiment, the frequency compensation circuit 130' may be disposed between the first and second feedback terminals 212a and 212b and the resistor circuit 123'.

In an embodiment, the power management IC 120' may be supplied with a feedback voltage VFB with respect to the input voltage VDI through the first feedback terminal 212a and the second feedback terminal 212b.

In an embodiment, the frequency compensation circuit 130' may include at least one capacitor CFFS, at least one switch SWS, and a variable feedback resistor RFBS'.

In an embodiment, the at least one capacitor CFFS may be selectively connected to the first feedback terminal 212a. In an example, the at least one switch SWS may be disposed to respectively correspond to the at least one capacitor CFFS. In an example, the at least one switch SWS may be selectively turned on by a control signal of the controller 121'. When the at least one switch SWS is selectively turned on, the at least one capacitor CFFS corresponding to the at least one switch SWS may be selectively connected to the first feedback terminal 212a.

In an embodiment, the variable feedback resistor RFBS' may be connected to the second feedback terminal 212b.

In an embodiment, the at least one capacitor CFFS may include a first feedback capacitor CFF1, a second feedback capacitor CFF2, a third feedback capacitor CFF3, and a fourth feedback capacitor CFF4. However, the at least one capacitor CFFS may include fewer or more than four feedback capacitors.

In an embodiment, the at least one switch SWS may include a first switch SW1, a second switch SW2, a third switch SW3, and a fourth switch SW4. However, the at least one switch SWS may include fewer or more than four switches.

In an embodiment, the first switch SW1, the second switch SW2, the third switch SW3, and the fourth switch SW4 may be connected to a node N21, and the at least one switch SWS may be disposed to be connected in parallel.

In an embodiment, the at least one capacitor CFFS may be disposed to respectively correspond to the at least one switch SWS. When the at least one switch SWS is turned on, the at least one capacitor CFFS may be selectively connected to the first feedback terminal 212a.

For example, the first feedback capacitor CFF1 may be disposed to correspond to the first switch SW1. The first feedback capacitor CFF1 may be selectively connected to the first feedback terminal 212a when the first switch SW1 is turned on. The second feedback capacitor CFF2 may be disposed to correspond to the second switch SW2. The second feedback capacitor CFF2 may be selectively connected to the first feedback terminal 212a when the second switch SW2 is turned on. The third feedback capacitor CFF3 may be disposed to correspond to the third switch SW3. The third feedback capacitor CFF3 may be selectively connected to the first feedback terminal 212a when the third switch SW3 is turned on. The fourth feedback capacitor CFF4 may be disposed to correspond to the fourth switch SW4. The fourth feedback capacitor CFF4 may be selectively connected to the first feedback terminal 212a when the fourth switch SW4 is turned on.

In an embodiment, one end of the variable feedback resistor RFBS' may be connected to the second feedback terminal 212b, and the other end of the variable feedback resistor RFBS' may be connected to a node N22.

Table 2 represents an example of a capacitance set in the at least one capacitor CFFS and a resistance value of the variable feedback resistor RFBS' according to the control signal.

TABLE 2

| CFF | 00: 680 pF | 01: 1 nF | 10: 4.7 nF | 11: 10 nF |
|---|---|---|---|---|
| RFBS' | 00: 100 Ω | 01: 500 Ω | 10: 1 kΩ | 11: 10 kΩ |

In an embodiment, the control signal for the at least one capacitor CFFS and the variable feedback resistor RFBS' may include a plurality of bits. In an embodiment, the controller 121' may generate the control signal, corresponding to the plurality of bits.

In an embodiment, an optimum frequency compensation value may be applied by changing the resistance value of the variable feedback resistor RFBS, corresponding to the plurality of bits.

In an embodiment, the at least one switch SWS may be turned on, based on the control signal generated by the controller 121, corresponding to the plurality of bits.

In an embodiment, the controller 121' may generate a first control signal when a bit value is 00. The first switch SW1 may be turned on corresponding to the first control signal, so that the first feedback capacitor CFF1 is connected to the first feedback terminal 212a. A capacitance of the first feedback capacitor CFF1 may be about 680 pF. The resistance value of the variable feedback resistor RFBS' may be set to 100Ω.

In an embodiment, the controller 121' may generate a second control signal when a bit value is 01. The second switch SW2 may be turned on corresponding to the second control signal, so that the second feedback capacitor CFF2 is connected to the first feedback terminal 212a. A capacitance of the second feedback capacitor CFF2 may be about 1 nF. The resistance value of the variable feedback resistor RFBS' may be set to 500Ω.

In an embodiment, the controller 121' may generate a third control signal when a bit value is 10. The third switch SW3 may be turned on corresponding to the third control signal, so that the third feedback capacitor CFF3 is connected to the first feedback terminal 212a. A capacitance of the third feedback capacitor CFF3 may be about 4.7 nF. The resistance value of the variable feedback resistor RFBS' may be set to 1 kΩ.

In an embodiment, the controller 121' may generate a fourth control signal when a bit value is 11. The fourth switch SW4 may be turned on corresponding to the fourth control signal, so that the fourth feedback capacitor CFF4 is connected to the first feedback terminal 212a. A capacitance of the fourth feedback capacitor CFF4 may be about 10 nF. The resistance value of the variable feedback resistor RFBS' may be set to 10 kΩ.

In an embodiment, a capacitance of the feedback capacitor CFFS and a resistance value of the variable feedback resistor RFBS, which are changed according to a control signal corresponding to the bit value, may be set according to a magnitude of a line resistance and a load current with respect to the input voltage VDI.

In an embodiment, the power management IC 120' may include the resistor circuit 123'. In an example, the resistor circuit 123' may be connected to the frequency compensation circuit 130'. In an example, the resistor circuit 123' may be connected in series between an input terminal of the controller 121' and the frequency compensation circuit 130'. In an example, the resistor circuit 123' ma include a first resistor R1' and a second resistor R2'.

In an embodiment, one end of the first resistor R1' may be connected to the node N22, and the other end of the first resistor R1' may be connected to the input terminal of the controller 121'.

In an embodiment, one end of the second resistor R2' may be connected to the input terminal of the controller 121, and the other end of the second resistor R2' may be connected to the ground voltage.

Figure 7:
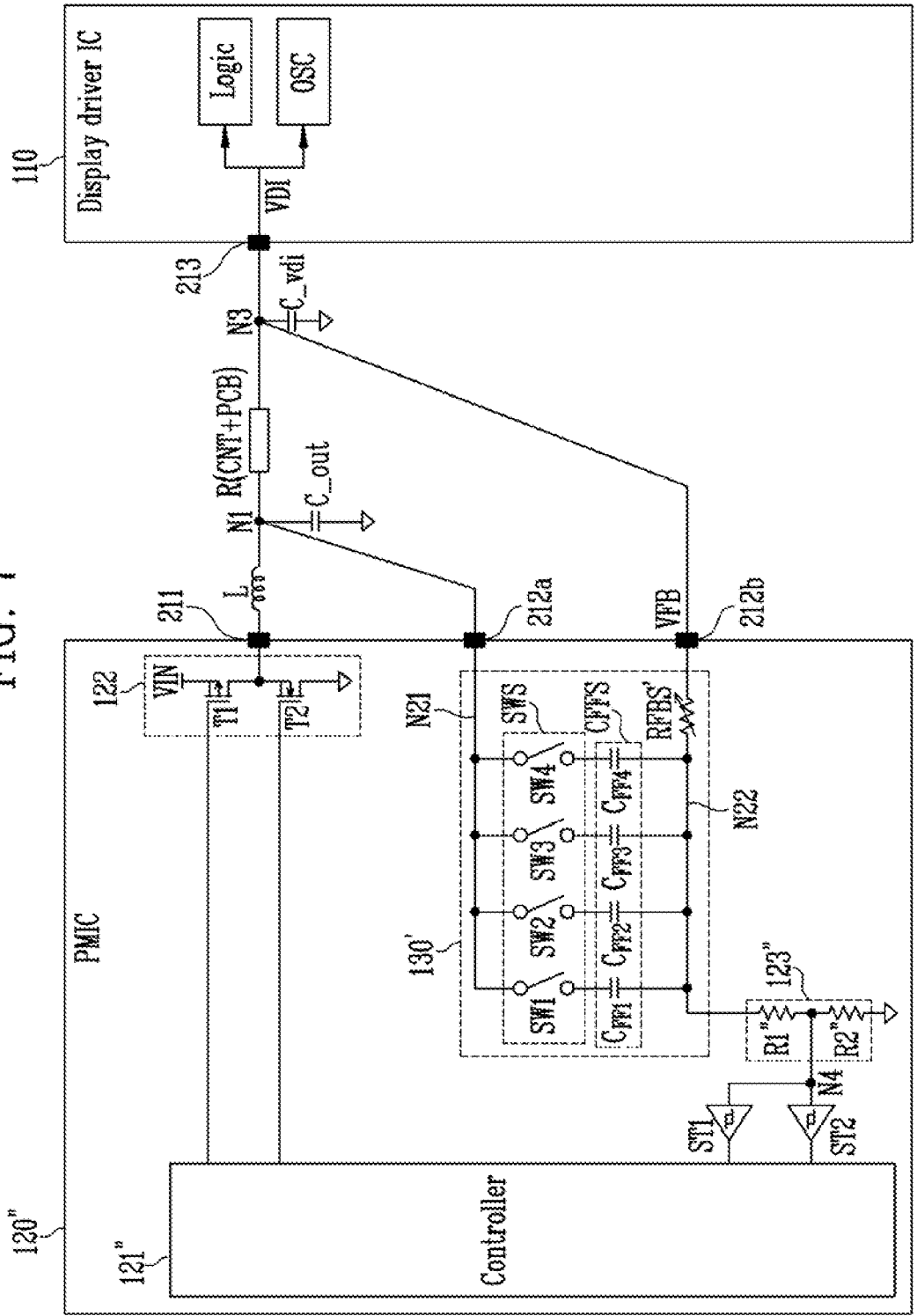
FIG. 7 illustrates a power management IC, a display driver IC, and a frequency compensation circuit in accordance with other embodiments of the present disclosure.

FIG. 7 illustrates a power management IC 120", a display driver IC 110, and a frequency compensation circuit 130' in accordance with other embodiments of the present disclosure.

In FIG. 7, components identical to those described with reference to FIG. 2 are designated by like reference numerals, and their overlapping descriptions will be omitted.

Referring to FIG. 7, the power management IC 130" may include a resistor circuit 123", a first Schmitt trigger circuit ST1 and a second Schmitt trigger circuit ST2.

FIG. 7 is a diagram illustrating an embodiment in which a capacitance is automatically changed to a capacitance of an optimized compensation capacitor according to a feedback voltage VFB.

In an embodiment, the resistor circuit 123" may include a first resistor R1" and a second resistor R2". The resistor circuit 123" may be connected in series between a fourth node N4 and the frequency compensation circuit 130'.

In an embodiment, one end of the first resistor R1" may be connected to a node N22, and the other end of the first resistor R1" may be connected to the fourth node N4.

In an embodiment, one end of the second resistor R2" may be connected to the fourth node N4, and the other end of the second resistor R2" may be connected to a ground voltage.

In an embodiment, the first Schmitt trigger circuit ST1 and the second Schmitt trigger circuit ST2 may be connected in parallel to each other, and be connected to the resistor circuit 123". For example, the first Schmitt trigger circuit ST1 and the second Schmitt trigger circuit ST2 may be connected to the fourth node N4.

In an embodiment, each of the first Schmitt trigger circuit ST1 and the second Schmitt trigger circuit ST2 may be disposed between a controller 121" and the resistor circuit 123".

In an embodiment, the first Schmitt trigger circuit ST1 may be connected to the controller 121", and determine whether the feedback voltage VFB with respect to an input voltage VDI supplied to an input terminal 213 satisfies a first condition. The first condition may be a condition for determining whether the feedback voltage VFB with respect to the input voltage VDI corresponds to a first voltage or higher.

In an embodiment, the second Schmitt trigger circuit ST2 may be connected to the controller 121', and determine whether the feedback voltage VFB with respect to the input voltage VDI supplied to the input terminal 213 satisfies a second condition. The second condition may be a condition for determining whether the feedback voltage VFB with respect to the input voltage VDI corresponds to a second voltage or higher.

In an embodiment, the first voltage may include a voltage corresponding to 0.95 time of a predetermined reference voltage. The second voltage may include a voltage corresponding to 0.9 time of the predetermined reference voltage.

In an embodiment, when the feedback voltage VFB with respect to the input voltage VDI satisfies the first condition, the feedback voltage VFB may correspond to the first voltage or higher. When the feedback voltage VFB corresponds to the first voltage or higher, the controller 121" may apply a control signal for decreasing a response speed. In an example, the control signal for decreasing the response speed may include a control signal for allowing a capacitor having a low capacitance among at least one capacitor CFFS to be connected to a first feedback terminal 212a through at least one switch SWS. For example, the controller 121" may include a control signal (e.g., a control signal CS1 shown in FIG. 8) for decreasing the response speed. A first feedback capacitor CFF1 having a lowest capacitance among first to fourth feedback capacitors CFF1 to CFF4 may be connected to the first feedback terminal 212a in response to the control signal. For example, the first feedback capacitor CFF1 may be connected to the first feedback terminal 212a by closing the first switch SW1.

In an embodiment, when the feedback voltage VFB with respect to the input voltage VDI does not satisfy the first condition but satisfies the second condition, the feedback voltage VFB may correspond to less than the first voltage and the second voltage or higher. When the feedback voltage VFB corresponds to less than the first voltage and the second voltage or higher, the controller 121" may apply a control signal for maintaining the response speed.

In an embodiment, when the feedback voltage VFB with respect to the input voltage VDI does not satisfy the second condition, the feedback voltage VFB may correspond to less than the second voltage. When the feedback voltage VFB corresponds to less than the second voltage, the controller 121" may apply a control signal for increasing the response speed. In an example, the control signal for increasing the response speed may include a signal for allowing a capacitor having a high capacitance among the at least one capacitor CFFS to be connected to the first feedback terminal 212a through the at least one switch SWS. For example, the controller 121" may apply a control signal (e.g., a control signal CS2 shown in FIG. 8) for increasing the response speed. The fourth feedback capacitor CFF4 having a highest capacitance among the first to fourth feedback capacitors CFF1 to CFF4 may be connected to the first feedback terminal 212a in response to the control signal. For example, the fourth feedback capacitor CFF4 may be connected to the first feedback terminal 212a by closing the fourth switch SW4.

Figure 8:
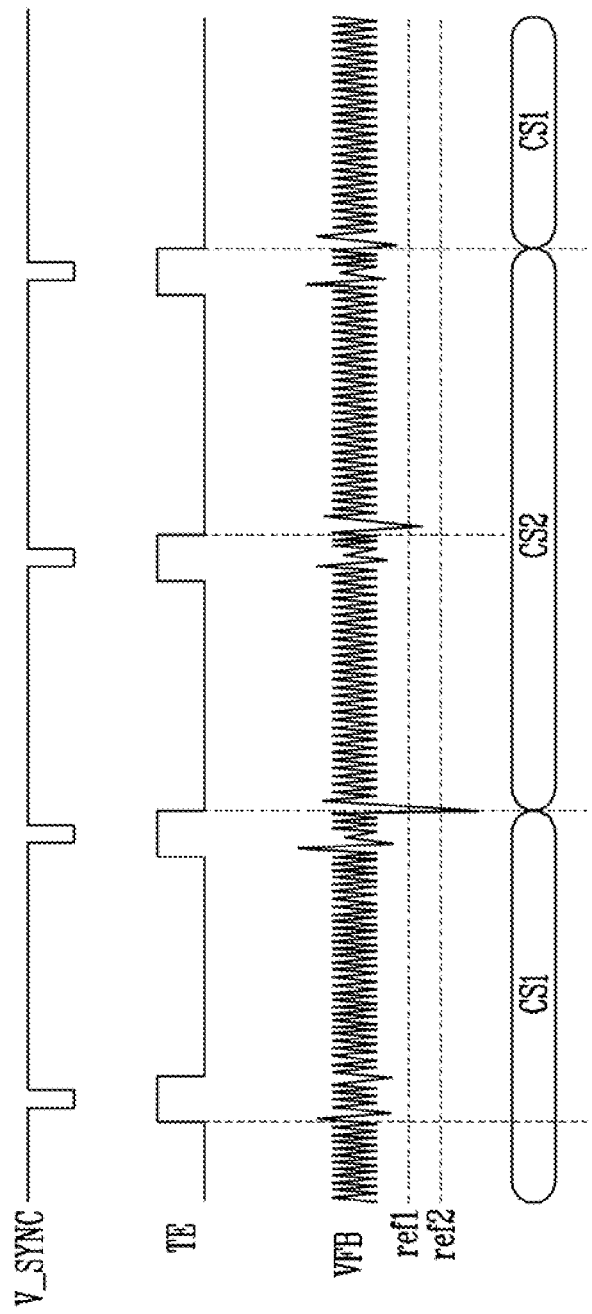
FIG. 8 illustrates a control signal for a frequency compensation circuit in accordance with other embodiments of the present disclosure.

FIG. 8 illustrates a control signal for the frequency compensation circuit 130' in accordance with other embodiments of the present disclosure.

In an embodiment, a vertical blank period TE is a black period, and may overlap with a vertical synchronization signal V_SYNC. For example, when the vertical blank period TE is high the vertical synchronization signal V_SYNC may be low.

In an embodiment, the magnitude of the feedback voltage VFB with respect to the input voltage VDI may be changed in the vertical blank period TE. For example, the feedback voltage VFB may experience or low or high spike in the vertical blank period TE.

In an embodiment, when the feedback voltage VFB with respect to the input voltage VDI is a first voltage ref1 or higher, the controller 121" may apply the control signal CS1 for decreasing the response speed.

In an embodiment, when the feedback voltage VFB with respect to the input voltage VDI is changed from the first voltage ref1 or higher to less than a second voltage ref2, the controller 211" may apply the control signal CS2 for increasing the response speed. When the control signal CS2 is applied to increase the response speed, a value of at least one capacitor (e.g., one of CFF1-CFF4) connected to the first feedback terminal 212a may be increased.

In an embodiment, when the feedback voltage VFB with respect to the input voltage VDI is maintained as the second voltage ref2 or higher and less than the first voltage ref1, the controller 121" may maintain a control signal for maintaining the response speed. When the control signal is maintained to maintain the response speed, a value of at least one capacitor (e.g., one of CFF1-CFF4) connected to the first feedback terminal 212a may be maintained.

In an embodiment, when the feedback voltage VFB with respect to the input voltage VDI is changed from the second voltage ref2 or higher and less than the first voltage ref1 to the first voltage or higher, the controller 121" may apply the control signal CS1 for decreasing the response speed. When the control signal CS1 is applied to decrease the response speed, a value of at least one capacitor (e.g., one of CFF1-CFF4) connected to the first feedback terminal 212a may be decreased.

In the display device in accordance with embodiments of the present disclosure, power loss which may occur in the display driver IC can be prevented when the display panel is driven according to different load conditions.

In the display device in accordance with embodiments of the present disclosure, oscillation of a converter disposed in the power management IC is prevented. Thus, the power management IC can be supplied with a stable feedback voltage, and the display driver IC can be supplied with a stable power voltage.

In the display device in accordance with embodiments of the present disclosure, a separate regulator for converting the power voltage into a voltage suitable for driving the display panel is not disposed in the display driver IC. Thus, the area of the display driver IC can be reduced.

In the display device in accordance with embodiments of the present disclosure, a standard design according to a module environment is possible. Thus, cost of a manufacturing process can be saved.

Example embodiments of the present disclosure have been disclosed herein, and although specific terms are employed, they are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device, comprising:
a power management integrated circuit (IC) including a feedback terminal for receiving a feedback voltage that corresponds to an input voltage, a first resistor and a second resistor, which are connected to the feedback terminal, and an output terminal for supplying a first voltage;
a display driver IC electrically connected to the power management IC, the display driver IC including an input terminal for receiving the input voltage that corresponds to the first voltage; and
a frequency compensation circuit connected to the input terminal, the feedback terminal, and the output terminal, the frequency compensation circuit including a feedback capacitor and a feedback resistor, wherein a value of the feedback resistor is smaller than a value of the first resistor and a value of the second resistor.

2. The display device of claim 1, wherein the power management IC further includes:
a controller connected to the feedback terminal, the controller configured to control the first voltage by outputting a control signal to a voltage output circuit to maintain the input voltage at a constant level, based on the feedback voltage received through the feedback terminal; and
the voltage output circuit connected to the output terminal, the voltage output circuit configured to turn on/off a first transistor and a second transistor in response to the control signal received from the controller.

3. The display device of claim 2, wherein the first resistor includes a first end connected to the feedback terminal and a second end connected to an input node of the controller, and
the second resistor includes a first end connected to the input node of the controller and a second end connected to a ground voltage.

4. The display device of claim 1, wherein the feedback capacitor of the frequency compensation circuit is disposed between a first node connected to the output terminal and a second node connected to the feedback terminal, and
wherein the feedback resistor is disposed between the second node and a third node connected to the input terminal.

5. The display device of claim 1, further comprising a circuit board including a connector for connecting the output terminal of the power management IC and the input terminal of the display driver IC to each other.

6. The display device of claim 5, further comprising:
an inductor connected between the output terminal and the first node; and
a parasitic capacitor disposed between the first node and the circuit board, the parasitic capacitor being connected to a ground voltage.

7. The display device of claim 1, wherein the display driver IC includes a timing controller, and
wherein the input voltage applied through the input terminal of the displays driver includes a voltage for controlling the timing controller.

8. A display device, comprising:
a power management integrated circuit (IC) including a feedback terminal for receiving a feedback voltage that corresponds to an input voltage, a first resistor and a second resistor, which are connected to the feedback terminal, and an output terminal for supplying a first voltage;
a display driver IC electrically connected to the power management IC, the display driver IC including an input terminal for receiving the input voltage that corresponds to the first voltage; and
a frequency compensation circuit connected to the input terminal, the feedback terminal, and the output terminal, the frequency compensation circuit including a feedback capacitor and a feedback resistor,
wherein the first resistor and the second resistor include the same resistance value.

9. A display device, comprising:
a power management integrated circuit (IC) including a frequency compensation circuit and an output terminal for supplying a first voltage; and
a display driver IC electrically connected to the power management IC, the display driver IC including an input terminal configured to receive an input voltage corresponding to the first voltage,
wherein the frequency compensation circuit includes:
a first feedback terminal and a second feedback terminal, wherein the first feedback terminal and the second feedback terminal are configured to receive a feedback voltage corresponding to the input voltage;
at least one capacitor connected to the first feedback terminal; and
a variable feedback resistor connected to the at least one capacitor and the second feedback terminal.

10. The display device of claim 9, wherein the power management IC further includes a controller connected to the output terminal and the frequency compensation circuit, wherein the controller is configured to control the first voltage output through the output terminal to maintain the input voltage at a constant level, based on the feedback voltage.

11. The display device of claim 10, wherein the frequency compensation circuit includes at least one switch selectively turned on by a control signal of the controller, and
wherein the at least one capacitor is selectively connected to the first feedback terminal by the at least one switch.

12. The display device of claim 9, wherein a capacitance of the at least one capacitor and a value of the variable feedback resistor are set based on a magnitude of a line resistance and a load current with respect to the input voltage.

13. The display device of claim 11, wherein the controller of the power management IC is configured to:
generate a first control signal for decreasing a value of the at least one capacitor when the feedback voltage is a first voltage or higher;
generate a second control signal for increasing the value of the at least one capacitor when the feedback voltage is less than a second voltage; and
maintain the control signal to maintain the value of the at least one capacitor when the feedback voltage is less than the first voltage and the second voltage or higher.

14. The display device of claim 13, wherein the first voltage is 0.95 times a predetermined voltage, and
the second voltage is 0.9 times the predetermined voltage.

15. The display device of claim 13, wherein the power management IC further includes a first resistor and a second resistor, which are connected in series to the frequency compensation circuit.

16. The display device of claim 15, wherein the power management IC includes a first Schmitt trigger circuit and a second Schmitt trigger circuit, which are connected in parallel to a node connected to the first resistor and the second resistor, wherein the first Schmitt trigger circuit is connected to the controller, and is configured to determine whether the feedback voltage is the first voltage or higher, and wherein the second Schmitt trigger circuit is connected to the controller, and is configured to determine whether the feedback voltage is the second voltage or higher.

17. The display device of claim 15, wherein the value of the variable feedback resistor of the frequency compensation circuit is smaller than a value of the first resistor and a value of the second resistor.

18. The display device of claim 9, wherein the power management IC further includes a circuit board including a connector for connecting the output terminal of the power management IC and the input terminal of the display driver IC to each other.

\* \* \* \* \*